(12) United States Patent
Wong et al.

(10) Patent No.: US 12,288,160 B2
(45) Date of Patent: Apr. 29, 2025

(54) TRANSFER LEARNING WITH BASIS SCALING AND PRUNING

(71) Applicant: INTERNATIONAL BUSINESS MACHINES CORPORATION, Armonk, NY (US)

(72) Inventors: Chun Lok Wong, San Jose, CA (US); Mehdi Moradi, San Jose, CA (US); Satyananda Kashyap, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 17/349,251

(22) Filed: Jun. 16, 2021

(65) Prior Publication Data

US 2022/0405596 A1 Dec. 22, 2022

(51) Int. Cl.
*G06N 3/082* (2023.01)
*G06F 18/2137* (2023.01)
*G06N 3/0464* (2023.01)
*G06N 3/084* (2023.01)
*G06N 3/096* (2023.01)

(52) U.S. Cl.
CPC ......... *G06N 3/082* (2013.01); *G06F 18/2137* (2023.01); *G06N 3/0464* (2023.01); *G06N 3/084* (2013.01); *G06N 3/096* (2023.01)

(58) Field of Classification Search
CPC ...... G06N 3/082; G06N 3/0464; G06N 3/084; G06N 3/096; G06F 18/2137
See application file for complete search history.

(56) References Cited

U.S. PATENT DOCUMENTS 10,242,313 B2 *  3/2019  LaRue .................. G06N 3/044
11,410,015 B1 *  8/2022  Naumov ................ G06N 7/01
(Continued)

FOREIGN PATENT DOCUMENTS

CN    104616031 B    6/2018
CN    108322445 A    7/2018
(Continued)

OTHER PUBLICATIONS

Y. Zhang, W. Ding and C. Liu, "Summary of Convolutional Neural Network Compression Technology," 2019 IEEE International Conference on Unmanned Systems (ICUS), Beijing, China, 2019, pp. 480-483, doi: 10.1109/ICUS48101.2019.8995969. (Year: 2019).*

(Continued)

*Primary Examiner* — James T Tsai
(74) *Attorney, Agent, or Firm* — Caleb D. Wilkes

(57) ABSTRACT

Methods and systems for performing transfer learning with basis scaling and pruning. One method includes obtaining a pre-trained deep convolutional neural network (DCNN), decomposing each weight matrix of the DCNN, and decomposing each convolutional layer by applying the respective decomposed weight matrix to the convolution layer to form a first layer which comprises the left matrix for convolution, and a second layer which comprises the right matrix for convolution. The method also includes providing a basis-scaling convolutional layer having a weight matrix that is derived by a function of singular values and the right singular vectors and training the basis scaling factors of the basis-scaling convolutional layers.

20 Claims, 11 Drawing Sheets

(56) References Cited

U.S. PATENT DOCUMENTS

| | | | |
|---|---|---|---|
| 12,061,988 B1* | 8/2024 | Sather | G06F 9/3455 |
| 2013/0185314 A1 | 7/2013 | Rubinstein et al. | |
| 2015/0170020 A1* | 6/2015 | Garimella | G06N 3/082 |
| | | | 706/14 |
| 2018/0231871 A1 | 8/2018 | Wang et al. | |
| 2019/0042982 A1 | 2/2019 | Qu et al. | |
| 2019/0108444 A1* | 4/2019 | Song | G06N 3/045 |
| 2020/0211188 A1 | 7/2020 | Gao et al. | |
| 2020/0349439 A1* | 11/2020 | Luo | G06F 17/15 |
| 2021/0044303 A1 | 2/2021 | Han et al. | |
| 2021/0224656 A1* | 7/2021 | Foncubierta Rodriguez | |
| | | | G06N 20/00 |
| 2021/0232407 A1* | 7/2021 | Liu | H03M 7/6011 |
| 2021/0374537 A1* | 12/2021 | Bhalgat | G06N 3/063 |
| 2022/0092423 A1* | 3/2022 | Chakaravarthy | G06F 18/23 |
| 2022/0405596 A1* | 12/2022 | Wong | G06N 3/082 |

FOREIGN PATENT DOCUMENTS

| | | | | |
|---|---|---|---|---|
| CN | 105469111 B | | 3/2019 | |
| CN | 110598848 A | | 12/2019 | |
| CN | 110874636 A | * | 3/2020 | G06N 3/045 |
| CN | 111209901 A | | 5/2020 | |
| CN | 111444747 A | | 7/2020 | |

OTHER PUBLICATIONS

Deng et al., "ImageNet: A large-scale hierarchical image database," In IEEE Conference on Computer Vision and Pattern Recognition, 2009, pp. 248-255.

Denton et al., "Exploiting linear structure within convolutional networks for efficient evaluation," arXiv:1404.0736v2, 2014, 11 pages.

Frankle et al., "The lottery ticket hypothesis: Finding sparse, trainable neural networks," arXiv:1803.03635v5, 2019, 42 pages.

Garg et al., "A low effort approach to structured CNN design using PCA," IEEE Access, 2020, 8: 1347-1360.

Han et al., "Learning both weights and connections for efficient neural network," arXiv:1506.02626v3, 2015, 9 pages.

He et al., "Deep residual learning for image recognition," In IEEE Conference on Computer Vision and Pattern Recognition, 2016, pp. 770-778.

He et al., "Channel pruning for accelerating very deep neural networks," arXiv:1707.06168v2, 2017, 10 pages.

Huang et al., "Densely connected convolutional networks," arXiv:1608. 06993v5, 2017, 9 pages.

Jaderberg et al., "Speeding up convolutional neural networks with low rank expansions," arXiv:1405.3866v1, 2014, 12 pages.

Komblith et al., "Similarity of neural network representations revisited," arXiv:1905.00414v4, 2019, 20 pages.

Krizhevsky, "Learning multiple layers of features from tiny images," Technical report, 2009, 60 pages.

LeCun et al., "Gradient-based learning applied to document recognition," Proceedings of the IEEE, 1998, 86(11):2278-2324.

LeCun et al., "Optimal brain damage," In Advances in Neural Information Processing Systems, 1990, pp. 598-605.

Li et al., "Pruning filters for efficient convnets," arXiv:1608. 08710v3, 2017, 13 pages.

Li et al., "Revisiting batch normalization for practical domain adaptation," arXiv:1603.04779v4, 2016, 12 pages.

Lin et al., "HRank: Filter pruning using high-rank feature map," arXiv:2002.10179v2, 2020, 10 pages.

Liu et al., "Sparse convolutional neural networks," In IEEE Conference on Computer Vision and Pattern Recognition, 2015, pp. 806-814.

Liu et al., "Learning efficient convolutional networks through network slimming," arXiv:17018.06519v1, 2017, 10 pages.

Loshchilov et al., "SGDR: Stochastic gradient descent with warm restarts," arXiv:1608.03983v5, 2017, 16 pages.

Luo et al., "ThiNet: A filter level pruning method for deep neural network compression," arXiv:1707.06342v1, 2017, 9 pages.

Molchanov et al., "Importance estimation for neural network pruning," arXiv:1906.10771v1, 2019, 11 pages.

Molchanov et al., "Pruning convolutional neural networks for resource efficient inference," arXiv:1611.06440v2, 2017, 17 pages.

Raghu et al., SVCCA: Singular vector canonical correlation analysis for deep learning dynamics and interpretability, arXiv:1706. 305806v2, 2017, 17 pages.

Reinhold et al., "Filter pruning for efficient transfer learning in deep convolutional neural networks," In International Conference on Artificial Intelligence and Soft Computing, 2019, pp. 191-202.

Sandler et al., "MobileNetV2: Inverted residuals and linear bottlenecks," arXiv:1801.04381v4, 2019, 14 pages.

Schwartz et al., "Green AI," arXiv:1907.10597.v3, 2019, 12 pages.

Simonyan et al., "Very deep convolutional networks for large-scale image recognition," arXiv:1409.1556v6, 2015, 14 pages.

Tan et al., "A survey on deep transfer learning," arXiv:1808. 01974v1, 2018, 10 pages.

Wen et al., "Learning structured sparsity in deep neural networks," arXiv: 1608.03665v4, 2016, 10 pages.

Xiao et al., "Fashion-MNIST: a novel image dataset for benchmarking machine learning algorithms," arXiv:1708.07747.v2, 2017, 6 pages.

Yang et al., "Learning low-rank deep neural networks via singular vector orthogonality regularization and singular value sparsification," arXiv:2004.09031v1, 2020, 14 pages.

Ye et al., "Rethinking the smaller-norm-less-informative assumption in channel pruning of convolution layers," arXiv:1802. 00124v2, 2018, 11 pages.

Zhang et al., "Understanding deep learning requires rethinking generalization," arXiv:1611.03530v2, 2017, 15 pages.

Zhang et al., "Accelerating very deep convolutional networks for classification and detection," arXiv:1505.06798v2, 2015, 14 pages.

International Search Report and Written Opinion for Application No. PCT/CN2022/097127 dated Jul. 27, 2022 (9 pages).

* cited by examiner

| Model | Accuracy | Parameters (PR) | FLOPs (PR) |
|---|---|---|---|
| VGG-16 | 90.3% | 14.74M (0.0%) | 5.03G (0.0%) |
| Slimming | 90.2% | 8.50M (42.3%) | 3.17G (37.0%) |
| Basis | 90.7% | 7.86M (46.7%) | 2.81G (44.1%) |
| Double | 90.6% | 5.92M (59.9%) | 2.26G (55.0%) |
| DenseNet-121 | 94.7% | 7.05M (0.0%) | 0.93G (0.0%) |
| Slimming | 90.4% | 1.92M (72.8%) | 0.38G (58.8%) |
| Basis | 94.1% | 4.24M (39.9%) | 0.71G (24.4%) |
| Double | 90.8% | 2.18M (69.1%) | 0.44G (52.5%) |
| ResNet-50 | 93.4% | 23.61M (0.0%) | 1.29G (0.0%) |
| Slimming | 93.6% | 13.67M (42.1%) | 0.89G (31.0%) |
| Basis | 91.8% | 7.56M (68.0%) | 0.57G (55.3%) |
| Double | 92.1% | 6.16M (73.9%) | 0.50G (61.3%) |
| MobileNetV2 | 90.5% | 2.27M (0.0%) | 0.10G (0.0%) |
| Slimming | 89.8% | 1.12M (50.5%) | 0.06G (43.3%) |
| Basis | 90.9% | 1.96M (13.5%) | 0.10G (-0.7%) |
| Double | 90.3% | 1.05M (53.7%) | 0.07G (34.6%) |

FIG. 7A (Table 1)

| Model | Accuracy | Parameters (PR) | FLOPs (PR) |
|---|---|---|---|
| VGG-16 | 99.5% | 14.74M (0.0%) | 3.85G (0.0%) |
| Slimming | 99.5% | 2.75M (81.4%) | 0.86G (77.7%) |
| Basis | 99.6% | 2.07M (86.0%) | 0.66G (82.8%) |
| Double | 99.6% | 0.94M (93.6%) | 0.36G (90.5%) |
| DenseNet-121 | 99.6% | 7.05M (0.0%) | 0.71G (0.0%) |
| Slimming | 48.5% | 5.36k (99.9%) | 11.18M (98.4%) |
| Basis | 99.5% | 0.44M (93.7%) | 0.13G (81.9%) |
| Double | 99.3% | 0.14M (98.0%) | 0.05G (92.6%) |
| ResNet-50 | 99.6% | 23.61M (0.0%) | 1.05G (0.0%) |
| Slimming | 99.6% | 8.91M (62.3%) | 0.41G (60.4%) |
| Basis | 99.0% | 0.17M (99.3%) | 0.07G (93.6%) |
| Double | 98.9% | 0.12M (99.5%) | 0.05G (95.4%) |
| MobileNetV2 | 99.5% | 2.27M (0.0%) | 72.31M (0.0%) |
| Slimming | 99.5% | 0.48M (79.1%) | 14.86M (79.4%) |
| Basis | 99.5% | 0.79M (65.3%) | 38.62M (46.6%) |
| Double | 99.4% | 0.22M (90.1%) | 11.84M (83.6%) |

FIG. 7B (Table 2)

| Model | Accuracy | Parameters (PR) | FLOPs (PR) |
|---|---|---|---|
| VGG-16 | 92.8% | 14.74M (0.0%) | 3.85G (0.0%) |
| Slimming | 92.9% | 4.78M (67.6%) | 1.50G (61.1%) |
| Basis | 93.4% | 4.58M (68.9%) | 1.37G (64.5%) |
| Double | 93.5% | 2.50M (83.0%) | 0.84G (78.2%) |
| DenseNet-121 | 94.4% | 7.05M (0.0%) | 0.71G (0.0%) |
| Slimming | 93.4% | 0.83M (88.3%) | 0.16G (77.6%) |
| Basis | 94.4% | 2.48M (64.8%) | 0.37G (47.5%) |
| Double | 93.2% | 0.94M (86.6%) | 0.18G (75.0%) |
| ResNet-50 | 94.2% | 23.61M (0.0%) | 1.05G (0.0%) |
| Slimming | 94.1% | 10.01M (57.6%) | 0.52G (50.6%) |
| Basis | 93.6% | 3.04M (87.1%) | 0.26G (75.4%) |
| Double | 93.9% | 2.01M (91.5%) | 0.20G (81.2%) |
| MobileNetV2 | 93.2% | 2.27M (0.0%) | 72.31M (0.0%) |
| Slimming | 92.8% | 0.67M (70.7%) | 25.35M (64.9%) |
| Basis | 93.4% | 1.31M (42.3%) | 56.70M (21.6%) |
| Double | 93.1% | 0.45M (80.4%) | 24.48M (66.1%) |

FIG. 7C (Table 3)

| Model | Baseline | | Layer decomposed | |
|---|---|---|---|---|
| | Total | Trainable | Total | Trainable |
| VGG-16 | 14.74M | 13.58k | 16.55M | 17.77k |
| DenseNet-121 | 7.05M | 93.90k | 8.40M | 104.04k |
| ResNet-50 | 23.61M | 73.61k | 28.78M | 86.86k |
| MobileNetV2 | 2.27M | 46.92k | 2.73M | 49.96k |

FIG. 7D (Table 4)

| Model | Accuracy | Parameters (PR) | FLOPs (PR) |
|---|---|---|---|
| DenseNet-121 | 90.1% | 7.05M (0.0%) | 0.93G (0.0%) |
| Slimming | 83.5% | 1.94M (72.4%) | 0.38G (59.1%) |
| Taylor-FO | 80.8% | 2.17M (68.9%) | 0.47G (50.7%) |
| Basis | 89.2% | 3.67M (47.9%) | 0.61G (35.0%) |
| Double | 84.8% | 1.90M (73.0%) | 0.39G (58.7%) |
| ResNet-50 | 88.0% | 23.61M (0.0%) | 1.29G (0.0%) |
| Slimming | 88.3% | 13.37M (43.3%) | 0.85G (34.1%) |
| Taylor-FO | 84.2% | 5.99M (74.5%) | 0.72G (47.6%) |
| Basis | 85.1% | 7.42M (68.6%) | 0.54G (58.2%) |
| Double | 85.5% | 6.13M (74.1%) | 0.46G (63.9%) |

FIG. 7E (Table 5)

TRANSFER LEARNING WITH BASIS SCALING AND PRUNING

FIELD

Embodiments described herein generally relate to fine-tuning and pruning neural networks, such as for deep convolutional neural networks as part of transfer learning. In particular, starting from a deep convolutional neural network that is pre-trained on a labelled dataset, embodiments described herein fine-tune and prune the neural network for a classification task on a new dataset. The fine-tuning and pruning can be performed in a transformed space where the weight features are linearly independent.

SUMMARY

Deep convolutional neural networks are often used in the area of applied computer vision. Over the years, network architectures used for such computer vision applications (e.g., image analysis) have grown in terms of performance along with the number of layers and parameters. The use of these networks has also extended to resource-limited areas, such as edge computing. Edge computing is a distributed computing framework that brings enterprise applications closer to data sources, such as Internet of Things (IoT) electronic devices or local edge servers. As such, conventional neural network models (e.g., built on large mainframe servers), although accurate, may be problematic with regards to size especially when used in resource-limited computing environments. Accordingly, with the expansion to resource-limited areas, optimization of network architectures to minimize computational requirements is important. Furthermore, reduction in floating point operations (FLOPs) at inference time directly impacts power consumption of large-scale, consumer-facing applications of artificial intelligence (AI). As a result, advocates of "green" AI recommend the use of network size and the number of FLOPs as important performance evaluation metrics for neural networks along with accuracy.

Pruning can be used to improve architectural efficiency. Pruning is the process of finding architectural components of a network that can be removed without a large loss of performance. Pruning algorithms can be categorized in different ways. For example, pruning can be achieved by removing unstructured weights and connections or by removing structural contents, such as filters or layers. While many algorithms perform pruning directly on the convolutional weight matrix, other algorithms try to reconstruct the weight matrix or output features of the weight matrix via low-rank approximation to reduce inference time. Also, some algorithms perform pruning without considering image data (e.g., training images), while other algorithms use image data for better pruning ratios and accuracy.

Although these pruning frameworks may reduce network size, there are several limitations. For example, since the filters are linearly dependent in a layer, pruning in the original filter space can be ineffective. Also, low rank approximations require additional optimizations apart from backpropagation to perform filter or feature reconstructions. Furthermore, fine-tuning of the entire network after pruning is required in many pruning frameworks, which may not be desirable when performing transfer learning with limited data.

Transfer learning includes transferring pre-trained network model features developed for one dataset or task to be reused as a starting point for a model on another dataset or task. For example, a pre-trained model for one use (e.g., classification of natural images) may be used to create a new model for a different use (e.g., classification of medical images) by using one or more lower layers of the pre-trained model and training other layers (e.g., a last layer) to perform the desired new detection and classification. Transfer learning may be useful for domains in which large-scale and well-annotated datasets are scarce due to the cost of data acquisition and annotation, which is common for computer vision applications especially in the medical industry. However, the network resulting from transfer learning can be unnecessarily large and consequently inefficient as the dataset used to train the pre-trained model usually contains features that are not present in the target dataset.

Accordingly, embodiments described here relate to performing pruning in the context of transfer learning. Combining transfer learning and pruning as described herein provides efficient transfer learning using limited data with high accuracy while limiting network size.

For example, embodiments described here provide methods and systems for fine-tuning and pruning a deep convolutional neural network that is pre-trained on a labelled dataset so that the network can perform a classification task on a new dataset. The fine-tuning and pruning are performed in a transformed space where the weight features are linearly independent. For example, the methods and systems described herein fine-tune and prune the orthogonal bases obtained by applying singular value decomposition (SVD) on the convolutional weight matrices. In particular, the methods and systems described herein apply a pruning algorithm that prunes a convolutional layer in an orthogonal subspace regardless of network architecture. As the basis vectors are non-trainable to facilitate transfer learning, the methods and systems described herein introduce basis scaling factors that are responsible for both importance estimation and fine-tuning of basis vectors. The basis scaling factors are trainable by backpropagation during transfer learning and only contribute a very small number of trainable parameters. Therefore, the framework provided via the methods and systems described herein is ideal for transfer learning with limited training data. In addition, as batch normalization (BN) layers are trainable during transfer learning, the methods and systems described herein can use a double-pruning algorithm that combines basis pruning and network slimming for better flexibility and higher pruning ratios.

As described in more detail below, embodiments described herein were tested by transferring features of four ImageNet pre-trained models to classify CIFAR-10, MNIST, and Fashion-MNIST datasets. The results described below show the desirable characteristics of fine-tuning and pruning in orthogonal subspaces. For example, with minimal loss of classification accuracy (e.g., less than a 1% reduction in classification accuracy), the tested embodiment achieved high pruning ratios (e.g., pruning ratios up to 99.5% in parameters and 95.4% in FLOPs).

Accordingly, embodiments described herein provide a computer-implemented method of transfer learning, which may be implemented by an electronic processor. The computer-implemented method includes obtaining a pre-trained deep convolutional neural network (DCNN) including a plurality of convolution layers. Each convolution layer includes a weight matrix for convolution. The computer-implemented method further includes decomposing each weight matrix of the DCNN (e.g., by compact singular value decomposition (SVD)) into a left matrix whose columns are the left singular vectors, a diagonal matrix of singular values, and a right matrix whose columns are the right singular vectors. According to various embodiments, each of the left singular vectors and the right singular vectors is an orthonormal basis. According to an embodiment, the number of the left singular vectors is the same as the number of the right singular vectors and is the same as the number of the singular values.

The computer-implemented method further includes decomposing, using the decomposed matrices, each convolutional layer of the DCNN into two consecutive layers. According to an embodiment, the two consecutive layers include a first layer that is a convolutional layer with the left matrix as the weight matrix of the first layer, and a second layer that uses, as a weight matrix of the second layer, a basis-scaling convolutional layer having a weight matrix that is derived by a function of the singular values and the right singular vectors. The computer-implemented method includes training the basis scaling factors of the basis-scaling convolutional layers.

According to various embodiments, the computer-implemented method may further include removing iteratively, after each training, the basis scaling factors from each second layer and removing the corresponding matrix components in the left matrix and the right matrix until a convergence criteria is reached. According to various embodiments, the computer-implemented method may further include adding a batch normalization layer after each convolutional layer, when a batch normalization layer does not exist after each convolutional layer.

The left matrix includes left singular vectors, the diagonal matrix comprises singular values and the right matrix comprises right singular vectors. The left singular vectors are orthogonal to each other and the right singular vectors are orthogonal to each other. The left singular vectors and the right singular vectors may not have any explicit relation.

The computer-implemented method may include removing iteratively, after each training, the scaling factors from each batch normalization layer and removing the corresponding matrix components in the left matrix and the right matrix. The computer-implemented method may further include performing computer vision processing using the pruned neural network to detect an object in captured imagery or in an image data set.

According to various embodiments described herein, a system including a memory and an electronic processor may be configured to perform the functions of the computer-implemented method described above. According to various embodiments described herein, a non-transitory computer-readable medium provides computer-executable instructions that, when executed by a processor, causes the processor to perform the functions of a computer-implemented method or methods, as described in the present disclosure.

Other aspects of the embodiments will become apparent by consideration of the detailed description and accompanying drawings.

BRIEF DESCRIPTION OF THE DRAWINGS

FIGS. 7A-7E include Tables 1-5, respectively.

DETAILED DESCRIPTION

Before any embodiments are explained in detail, it is to be understood that the embodiments are not limited in their application to the details of construction and the arrangement of components set forth in the following description or illustrated in the following drawings. Other embodiments are capable of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or coupling, whether direct or indirect. Also, electronic communications and notifications may be performed using any known means including direct connections, wireless connections, etc.

A plurality of hardware and software-based devices, as well as a plurality of different structural components may be utilized to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments may be implemented in software (e.g., stored on non-transitory computer-readable medium) executable by one or more processors. As such, it should be noted that a plurality of hardware and software-based devices, as well as a plurality of different structural components, may be utilized to implement the embodiments. For example, "mobile device," "smartphone," "electronic device," "computing device," and "server" as described in the specification may include one or more electronic processors, one or more memory modules including non-transitory computer-readable media, one or more input/output interfaces, and various connections (e.g., a system bus) connecting the components.

Figure 1:
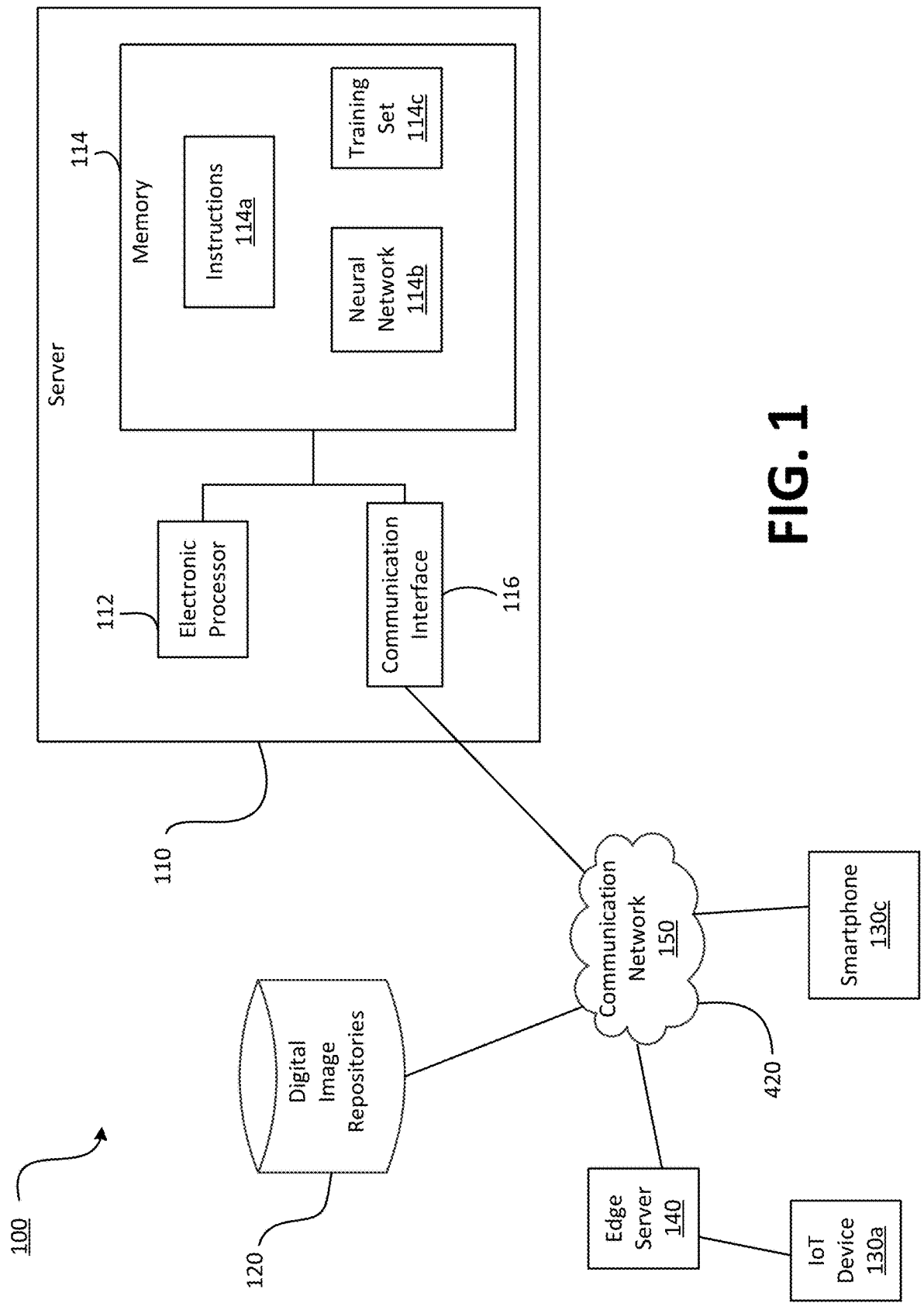
FIG. 1 illustrates a system for performing transfer learning with pruning according to various embodiments.

FIG. 1 illustrate a system 100 for performing transfer learning according to various embodiments. As illustrated in FIG. 1, the system 100 includes a server 110 and one or more image repositories 120. The server 110 communicates with the image repositories 120 over one or more wired or wireless communication networks 150. Portions of the wireless communication networks 150 may be implemented using a wide area network (WAN), such as the Internet, a local area network (LAN), such as a Bluetooth™ network or Wi-Fi™, and combinations or derivatives thereof. The system 100 may include more or fewer servers and the server 110 and the image repositories 120 illustrated in FIG. 1 are purely for illustrative purposes. For example, in some embodiments, the functionality described herein as being performed by the server 110 is performed via a plurality of servers in a distributed or cloud-computing environment. Also, in some embodiments, the image repositories 120 may be combined with the server 110 or may communicate with the server 110 over a dedicated communication channel (as compared to a network). Also, in some embodiments, the components illustrated in system 100 may communicate through one or more intermediary devices not illustrated in FIG. 1.

In some embodiments, the image repositories 120 stores image data that may be used to train a neural network during transfer learning as described above. As some embodiments described herein can be used with computer vision applications, such as applications within the medical industry, in some embodiments, the image repositories 120 stores volumes of two dimensional (2D) images, three dimensional (3D) images, videos, or combinations thereof. The image repository 120 may be, for example, a picture archiving and communication system (PACS), a cloud storage environment, or the like. The image data stored in the image repositories 120 may be generated by one or more different types of imaging modalities, such as an X-ray computed tomography (CT) scanner, a magnetic resonance imaging (MRI) scanner, or the like. It should be understood that the embodiments described herein can be used with various types of images and the embodiments described herein are not limited to medical image applications.

As illustrated in FIG. 1, the server 110 includes an electronic processor 112, a memory 114, and a communication interface 116. The electronic processor 112, the memory 114, and the communication interface 116 communicate wirelessly, over wired communication channels or buses, or a combination thereof. The server 110 may include additional components than those illustrated in FIG. 1 in various configurations. For example, in some embodiments, the server 110 includes multiple electronic processors, multiple memory modules, multiple communication interfaces, or a combination thereof. Also, as noted above, the functionality described herein as being performed by the server 110 may be performed in a distributed nature by a plurality of computers or servers located in various geographic locations.

The electronic processor 112 may be, for example, a microprocessor, an application-specific integrated circuit (ASIC), or another suitable central processing unit (CPU). The electronic processor 112 is generally configured to execute software instructions to perform a set of functions, including the functions described herein. The memory 114 includes a non-transitory computer-readable medium, such as random access memory (RAM), read-only memory (ROM), or the like. The memory 114 stores data, including instructions executable by the electronic processor 112. The communication interface 116 communicates with the other electronic devices external to the server 110. For example, the communication interface may include a wired or wireless transceiver or port, for communicating over the communication networks 150 and, optionally, one or more additional communication networks or connections.

As illustrated in FIG. 1, the memory 114 of the server 110 includes instructions 114a, a neural network 114b, and a training set 114c. The neural network 114b may be, for example, a two-dimensional (2D) U-net architecture, a 3D convolutional neural network (CNN), or the like. The neural network 114b can be a pre-trained neural network (e.g., trained via a source dataset) and, as described in more detail below, the server 110 uses transfer learning with basis scaling and pruning to create a new model for performing a new task (referred to herein as neural network 114b') using the neural network 114b, which was developed to perform a different task, as the starting point for a new model. As part of performing the transfer learning, the server 110 uses the training set 114c, which may represent a set of annotated images, wherein the annotations (labels) relate to the new (different) classification task. In some embodiments, the training set 114c is acquired by the server 110 from the image repositories 120. In some embodiments, after performing the transfer learning with basis scaling and pruning, the resulting generated neural network 114b' can be used by the server 110 to perform the desired classification (e.g., applied to one or more images). Alternatively or in addition, the generated neural network 114b' can be transmitted to one or more other devices. For example, as illustrated in FIG. 1, the neural network 114b' can be transmitted or shared with (e.g., via the communication network 150) an edge server 140, an IoT device 130a, a smartphone 130c, or a combination thereof.

Although the transfer learning with basis scaling and pruning process (e.g., method 200) has been described as being performed by a server 110 and transmitted to the edge server 140, according to one or more embodiments, the edge server 140, which communicates with edge/IoT devices, may perform the method of transfer learning with basis scaling and pruning described herein. In this embodiment, information regarding the pre-trained neural network can be transmitted by the server 110 to the edge server 140 and the edge server 140 can perform the method of transfer learning with basis scaling and pruning (e.g., method 200).

As described below in more detail, the server 110 is configured to perform transfer learning with basis scaling and simultaneous double pruning. Network pruning can be achieved by pruning individual weights or entire channels/filters. Although pruning individual weights or connections can achieve high compression ratios because of the flexibility, the practical speed-up can be limited given irregular weight sparsity unless specialized software or hardware are utilized. In contrast, channel pruning utilizes the structured sparsity. Although channel pruning is less flexible than weight level pruning, dense matrix structures are maintained after pruning and significant practical speed-up can be achieved with off-the-shelf libraries. Given the advantages mentioned above, embodiments described herein use channel pruning. However, to provide efficient transfer learning from one dataset to another potentially much smaller dataset, minimizing the number of trainable parameters during importance estimation and fine-tuning is desirable. To this end, embodiments described here may use scaling factors in batch normalization (BN) layers (e.g., using backpropagation, an additional optimizer to update scaling factors during training, or a combination thereof) as part of channel pruning, as scaling factors allow performance of filter-based fine-tuning, which requires much fewer trainable parameters. Furthermore, embodiments described herein can prune linearly independent filters obtained by applying singular value decomposition (SVD) or principal component analysis (PCA) to provide further increases in efficiency. Matrix factorization techniques, such as SVD and PCA, factor a convolutional weight matrix or a feature tensor into a specified canonical form to reveal properties that cannot be observed in the original space. Accordingly, this transformation enables special operations that lead to higher computational efficiency or accuracy. Embodiments described herein combine these advantages of SVD via basis vectors rescaling and pruning and, in particular, can perform double pruning (i.e., prunes in both transformed and original spaces) for improving pruning ratios. As the basis vectors described herein are non-trainable in the described transfer learning framework, orthogonality is preserved.

Figure 2A:
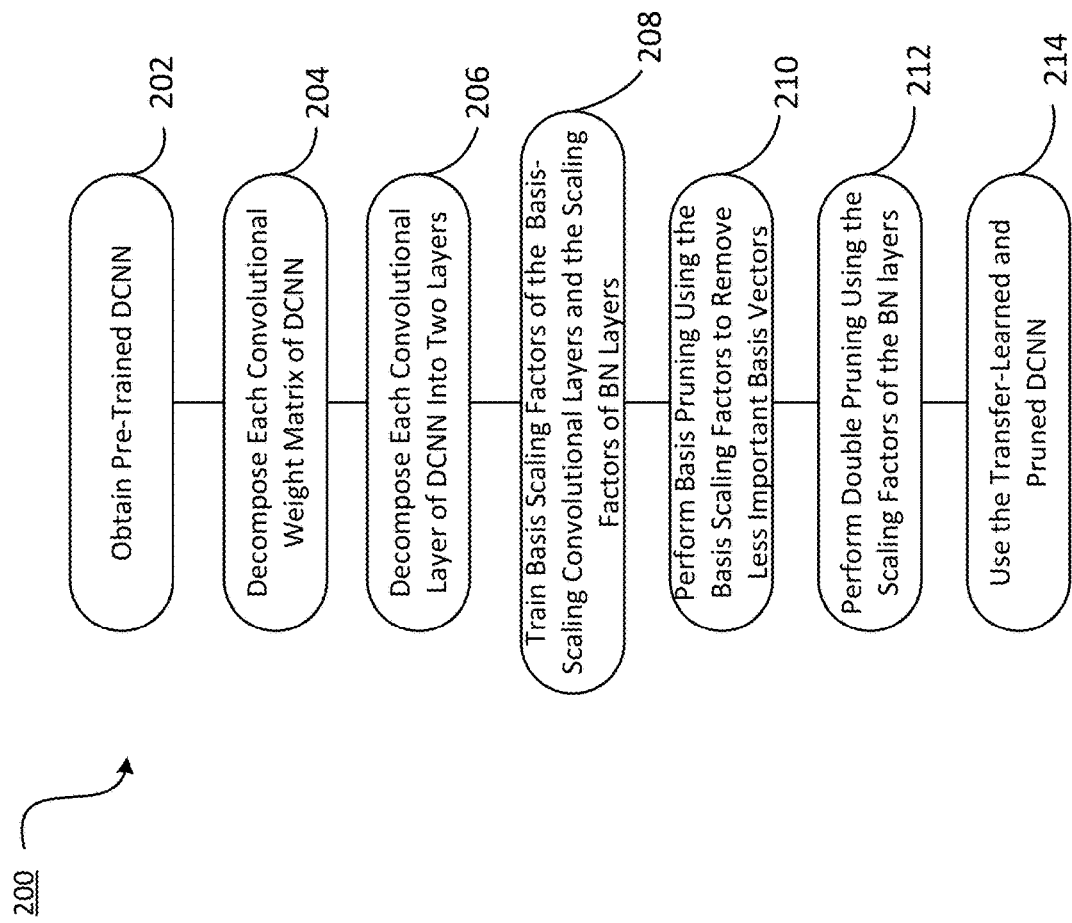
FIG. 2A is a flowchart illustrating a method of performing transfer learning with pruning using the system of FIG. 1 according to various embodiments.

For example, FIG. 2A is a flowchart illustrating a method 200 of performing transfer learning with pruning according to various embodiments. The method 200 can be implemented via computer-executable instructions that cause the various operations of the method 200 to be performed by a processor. For example, the method 200 is described herein as being performed via the server 110 (execution of the instructions 114a via the electronic processor 112). However, as noted above, different hardware and computing environments (such as a distributed computing environment) may be used.

As illustrated in FIG. 2A, the computer-implemented method 200 includes obtaining a pre-trained deep convolutional neural network (DCNN) including a plurality of convolution layers (at block 202), such as, for example, the network 114b. The method 200 also includes decomposing each convolutional weight matrix of the pre-trained DCNN (e.g., by compact singular value decomposition (SVD)) into a left matrix whose columns are the left singular vectors of the weight matrices, a diagonal matrix of singular values, and a right matrix whose columns are the right singular vectors of the weight matrices (at block 204).

The method 200 also includes decomposing each convolutional layer of the pre-trained DCNN into two layers (at block 206), for example, by applying the respective decomposed weight matrix to the convolution layer to form a first layer, which comprises the left matrix for convolution, and a second layer, which comprises the right matrix for convolution. In particular, decomposing into the two layers may include decomposing, using the decomposed weight matrices, each convolutional layer of the DCNN into two consecutive layers. The two consecutive layers include a first layer that is a convolutional layer with the left matrix as the weight matrix, and a second layer that is a basis-scaling convolutional layer having a weight matrix which is derived by a function of the singular values and the right singular vectors. For example, each convolution layer may include a weight matrix for convolution. Each of the left singular vectors and the right singular vectors may be an orthonormal basis. The number of the left singular vectors may be the same as the number of the right singular vectors and may be the same as the number of the singular values. The second layer may include a plurality of basis scaling factors corresponding to the matrix components in the left matrix and the right matrix and may be trainable by back propagation.

As illustrated in FIG. 2A, the computer-implemented method 200 also includes training of the basis scaling factors of the basis-scaling convolutional layers and the scaling factors of the BN layers (at block 208). After each basis-scaling convolutional layer is trained, basis pruning is performed using the basis scaling factors to remove less important basis vectors (at block 210). For example, the basis scaling factors from each second layer may be removed (pruned) with the corresponding matrix components in the left matrix and the right matrix.

As illustrated in FIG. 2A, the computer-implemented method 200 also performs double pruning (pruning using the scaling factors of the BN layers) as described below (at block 212) and uses the transfer-learned and basis pruned DCNN or double pruned DCNN (at block 214). For example, the server 110 (or a different server, edge server, IoT device, smartphone, or a combination thereof) may use the transfer-learned and basis pruned or double pruned DCNN for computer vision applications (or other applications, such as, for example, natural language processing applications). For example, the processor may perform computer vision processing using the basis pruned or double-pruned neural network. The computer vision processing (e.g., application processing) may include performing an action (e.g., updating a user interface, control movement of a robotic electronic device or another suitable action) based on performing computer vision processing using the basis pruned or double pruned neural network to detect an object (e.g., in a captured image or video, or in an image dataset).

For example, assume the pre-trained deep neural network 114b includes a plurality of convolution layers L (L1, L2, . . . , Ln) wherein each convolution layer Lj includes a weight matrix Mj for convolution. Accordingly, in this example, decomposing the layers includes decomposing each weight matrix Mj into a left matrix MLj, a diagonal matrix MDj, and a right matrix MRj. With these matrices, the decomposed weight matrix Mj can be applied to the layer Lj to form a first layer L'j comprising MLj for convolution and a second layer L"j comprising MRj for convolution. Wherein the second layer L"j includes a plurality of basis scaling factors corresponding to the matrix components in MLj and MRj and are trainable by back propagation. Continuing with this example, the basis scaling factors from each second layer L"j are removed iteratively, after each training, and the corresponding matrix components in MLj and MRj are removed until a convergence criteria is reached.

A batch normalization layer Bj is also added after the each Lj when a batch normalization layer does not exist after the each Lj. The left matrix MLj comprises left singular vectors LSVj, the diagonal matric MDj comprises singular values SVj and the right matrix MRj comprises right singular vectors RSVj. The LSVj are orthogonal to each other and the RSVj are orthogonal to each other, but the LSVj and RSVj do not have any explicit relation. With these BN layers, the scaling factors from each Bj are removed iteratively, after each training, and the corresponding matrix components are removed in MLj and MRj.

Further details regarding the method 200 are provided below. As described below, embodiments described herein present the convolutional weight matrix with orthogonal bases that allow more effective network pruning for transfer learning. In particular, the features of a convolutional layer are distributed among the linearly dependent filters and the representations of the features are different with different initializations. By representing the features with orthogonal bases (e.g., obtained by SVD or PCA), fewer channels are required to represent the useful features and network pruning in such subspaces can be more effective. In addition, using orthogonal bases (e.g., via SVD or PCA) for network pruning allows weights to be approximated with low-rank tensor approximations, which also reduces computational complexity. Filter pruning in the transformed space (e.g., using the orthogonal bases) provides improved effectiveness. As discussed in detail below, the weight matrix may be decomposed into orthogonal bases, and basis scaling may be used for importance estimation and fine-tuning. More filters can be pruned with minimal loss in accuracy. For example, as shown in Table 2 (FIG. 7B), converting an ImageNet-trained model (e.g., a ResNet-50 model) to an MNIST-trained model according to embodiments described herein resulted in pruning ratios of 99.5% in parameters and 95.4% in FLOPs with approximately a 1% reduction in classification accuracy.

Convolutional Weights Representation in Orthogonal Subspaces

Let $\mathbb{W} \in \mathbb{R}^{k_h \times k_w \times c_i \times c_o}$ [Equation 1] be the weight matrix of a convolutional layer (e.g., the 4-D convolutional weight matrix). $k_h$ and $k_w$ are the kernel height and kernel width, respectively, and $c_i$ and $c_o$ are the numbers of input and output channels, respectively. For efficient transfer learning, the convolutional weights may be assumed to be pre-trained and non-trainable. According to an embodiment, $\mathbb{W}$ may be reshaped into a two-dimensional (2-D) matrix $W \in \mathbb{R}^{k \times c_o}$ with $k=k_h \times k_w \times c_i$ [Equation 2] for further processing.

According to an embodiment, one or more of SVD and PCA may be used to represent the weights in an orthogonal basis. For example, compact SVD may be used for the representations.

The matrix W may be factorized by compact SVD as: $W=U\Sigma V^T$ [Equation 3] where $U \in \mathbb{R}^{k \times r}$ contains the columns of left-singular vectors which form an orthonormal basis, $V \in \mathbb{R}^{c_o \times r}$ contains the columns of right-singular vectors which form an orthonormal basis, and $\Sigma \in \mathbb{R}^{r \times r}$ is a diagonal matrix of singular values (e.g., in descending order). The variable r in these sub-equations U, V and $\Sigma$ equals min{k, $c_o$}, which is the maximum rank of W. As the columns of U yield an orthonormal basis, similar to those of V, $U^T U=V^T V=I$, with $I \in \mathbb{R}^{r \times r}$ being an identity matrix. With SVD, rescaling and pruning in the subspaces of U and V may be performed. It can be shown that PCA without standardization gives the same orthonormal bases.

To transform the weight matrix W with PCA, the rows and columns of W as samples and features, respectively, may be viewed. To use PCA, the symmetric covariance matrix $C \in \mathbb{R}^{c_o \times c_o}$ can be computed as:

$$C=W^T W \quad \text{[Equation 4]}$$

The relative scales among the channels are important, and, thus, the columns of W are not standardized. Substituting Equation 1 into Equation 4 yields $C=V\Sigma^2 V^T$ [Equation 5] as $U^T U=I$ and $\Sigma$ is diagonal. Therefore, the columns of V are the eigenvectors of C corresponding to the nonzero eigenvalues. Using PCA, W can be projected onto the orthonormal basis of V. With Equation 3, the projection becomes: $\overline{W}=WV=U\Sigma V^T V=U\Sigma$ [Equation 6] as $V^T V=I$. Thus, the columns of $\overline{W}$ are the left-singular vectors rescaled by the singular values. Therefore, PCA and SVD are equivalent in factorizing W.

Convolutional Layer Decomposition

Using SVD or PCA, the convolutional weights can be represented by the orthonormal bases in U and V. Although the contributions of the basis vectors are proportional to the corresponding singular values, most singular values are of similar magnitudes and choosing which to remove is non-trivial especially without considering the image data. The use of image data can help determine the importance of filters through metrics, such as the ranks of the feature maps or the gradients of the network weights. As one goal of transfer learning is to perform the transfer with limited data, preserving the original weights as much as possible while pruning is desirable. Therefore, similar to frameworks in which the relative importance of the filters is indicated by the scaling factors of the BN layers, a basis-scaling convolutional (referred to herein as "BasisScalingConv") layer to measure the importance of the basis vectors may be used.

Regarding convolutional layer decomposition, given a pre-trained convolutional layer with nontrainable convolutional weights W and bias $b \in \mathbb{R}^{c_o \times 1}$, let $x_i \in \mathbb{R}^{k \times 1}$ be a column vector of length $k=k_h \times k_w \times c_i$ which contains the features input to the convolutional layer at a spatial location (input features). The output features $x_o \in \mathbb{R}^{c_o \times 1}$ at the same spatial location can be obtained as: $x_o^T = x_i^T W + b^T = x_i^T U \overline{V}^T + b^T$ [Equation 7] by using Equation 3 with $\overline{V}^T = \Sigma V^T$. To rescale the basis vectors by their importance, a vector of basis scaling factors $s \in \mathbb{R}^r$ of non-negative scalars are used to indicate importance of basis vectors, and Equation 7 is modified as: $x_o^T = x_i^T U S \overline{V}^T + b^T$ [Equation 8] with $S \in \mathbb{R}^{r \times r}$ being a diagonal matrix of s. When S=I, Equations 7 and 8 are identical. Using Equation 8, the convolutional layer can be decomposed into two consecutive layers, as shown in FIG. 2B.

Figure 2B:
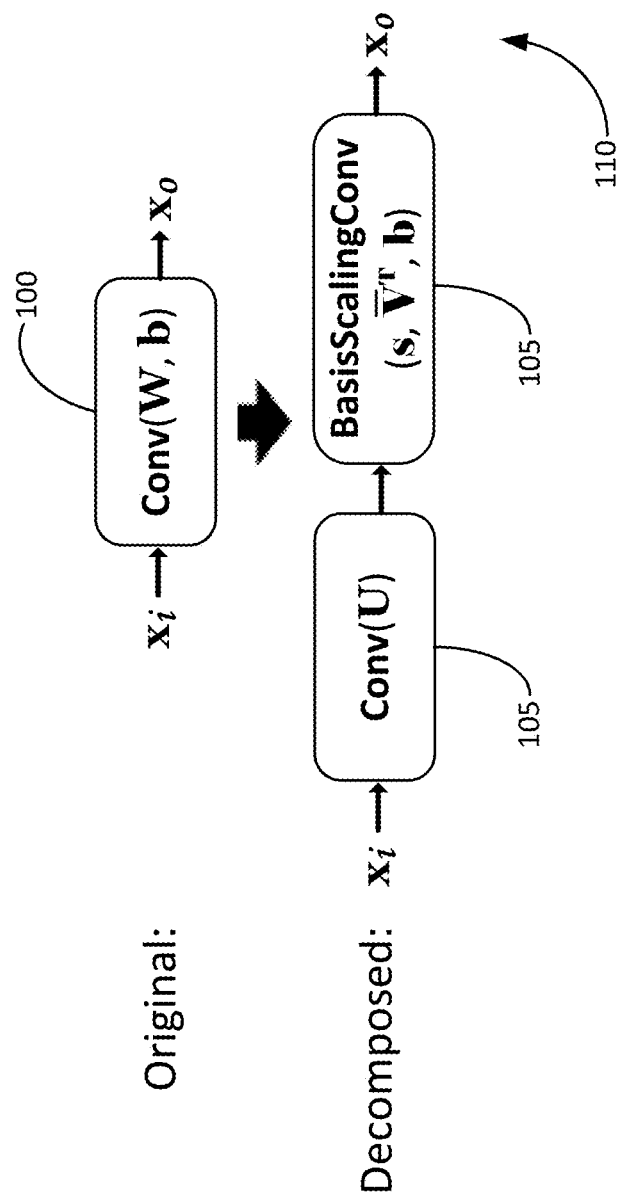
FIG. 2B illustrates decomposition of a convolutional layer according to various embodiments.

FIG. 2B shows decomposition of a convolutional layer. With regards to FIG. 2B, only the vector of basis scaling factors s is trainable during transfer learning.

The first layer is a regular convolutional layer which comprises U as the convolutional weights with no bias. The second layer is the BasisScalingConv layer which comprises s, $\overline{V}^T$, and b. $\overline{V}^T$ is used as the convolutional weights to transform the outputs from the previous layer back to the original space. During training, all weights in FIG. 2B may be non-trainable except s, according to various embodiments. When s is updated in each step (batch), each scalar in s rescales the corresponding row in $\overline{V}^T$. Instead of using Equation 8 as a single convolutional layer with $US\overline{V}^T$ as the kernel, dividing into two layers reduces the number of weights and thus computational complexity as the basis vectors are pruned. Although more weights are introduced before pruning, as compact SVD is used, the increase in the total number of weights is less than 22% with our tested models.

Transfer Learning with Basis Pruning

As noted above, transfer learning transforms neural network features trained from one dataset (e.g., a pre-trained network) to be applied to other datasets. Given a pre-trained neural network model, all layers are kept up to and including the last convolutional layer and the associating BN and activation layers, and a global average pooling layer and a final fully connected layer for classification may be added. For transfer learning with basis pruning, every convolutional layer is decomposed as discussed above. The transfer learning may also include adding BN layers when they do not exist for better domain adaptation. As BN layers are important for domain adaptation, the BN layers can be trainable during transfer learning and can be introduced after each convolutional layer when not present (e.g., VGGNet). Therefore, only the BN layers, the vector s in each BasisScalingConv layer, and the final fully-connected layer are trainable in some embodiments.

The L1 regularization is applied on the basis scaling factors s to enhance sparsity. The L1 regularization is not only important for enhancing the sparsity for larger pruning ratios, but also for more precise ranking of the importance of the basis vectors. FIGS. 6A and 6B described below are based on a study of the effects of different L1 parameters.

Figure 3B:
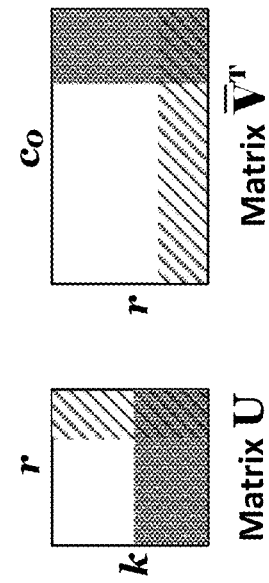
FIGS. 3A and 3B illustrate basis pruning and double pruning operations, respectively, according to various embodiments.
Figure 3A:
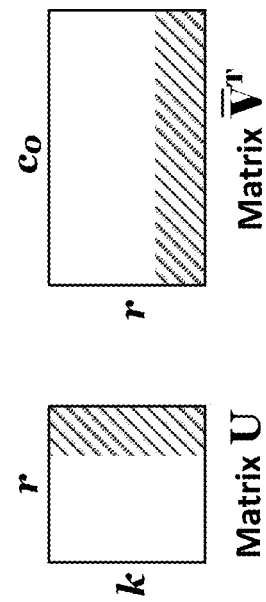

FIGS. 3A and 3B illustrate pruning operations according to various embodiments. FIG. 3A illustrates basis pruning, and FIG. 3B illustrates double pruning.

Basis Pruning

Basis pruning may include training the transformed network on the target dataset, and removing the basis vectors from the weight matrices having the corresponding basis scaling factors lower than a given threshold. As the sizes of $x_o$ and $x_i$ are not affected, basis pruning can be applied to any architectures. As shown in FIG. 3A, basis pruning may be performed by removing the same number of basis vectors from Matrix U (right hand hatched column) and Matrix $\overline{V}^T$ (lower hatched row).

After training with enough epochs for the desired classification accuracy, the basis vectors corresponding to the small scaling factors are pruned (FIG. 3A). Let $r_p<r$ be the number of scalars left after pruning, then U, S, and $\overline{V}^T$ in Equation 8 become $U_p \in R^{k \times r_p}$, $S_p \in R^{r_p \times r_p}$, and $\overline{V}_p^T \in R^{r_p \times c_o}$, respectively. As the sizes of $x_i$, $x_o$, and b are unaltered, basis pruning only affects the convolutional layer being pruned but not the subsequent layers. Therefore, basis pruning can be applied to many network architectures with conventional convolutions. In contrast, pruning in the original space requires pruning of the subsequent convolutional layer, which becomes complicated when skip connections or branching are involved. If an entire layer is pruned (i.e., $r_p=0$), all subsequent layers are removed.

Double Pruning with Batch Normalization

Double pruning may include the scaling factors in BN layers being used simultaneously for further pruning. Simultaneous may mean during a same operational timeframe. For example, as discussed further below, experiments were conducted with transfer learning (according to described embodiments) from ImageNet pre-trained models to other datasets (Models—VGG-16, DenseNet-121, ResNet-50, MobileNetV2 and Datasets—CIFAR-10, MNIST, Fashion-MNIST), which resulted in high pruning ratios with minimal loss in accuracy.

FIG. 3B shows double pruning (e.g., basis pruning of FIG. 3A and input pruning (lower gray row of Matrix U) and output pruning (right hand gray column of Matrix $\overline{V}^T$) using a previous BN layer and a subsequent BN layer, respectively). As the BN layers are trainable during transfer learning, scaling factors of the BN layers may be used for pruning when non-negative constraints and L1 regularization are imposed. The kernel weights correspond to the input and output of a convolutional layer and can be pruned by the BN layers before and after it, respectively, thereby allowing simultaneous pruning of the orthogonal basis and in the original space to be performed (FIG. 3B). That is, according to various embodiments, efficient transfer learning may be performed with basis scaling and simultaneous double pruning.

Pruning Procedure

Accordingly, as a summary of the above functionality, the pruning procedure (performed as part of transfer learning) includes the following steps:

Step 1. Given a pre-trained model, keep all layers up to and including the last convolutional layer and the associating BN and activation layers. Insert BN layers if needed.

Step 2. Decompose each convolutional layer into a convolutional layer and a BasisScalingConv layer as described above. A global average pooling layer and a final fully-connected layer for classification may be added.

Step 3. Train the model with only the BN layers, the scaling factors in the BasisScalingConv layers, and the fully-connected layer trainable.

Step 4. Prune the trained model. Remove the basis vectors whose scaling factors in the BasisScalingConv layers are lower than a given threshold. For double pruning, remove also the filters whose scaling factors in the BN layers that are lower than a given threshold.

Step 5. Train the pruned model as in Step 3 above.

Further iterations starting from Step 4 can be performed if desired, though one iteration is enough especially for simpler problems (e.g., MNIST). Note that in Steps 3 and 5, each scaling factor modifies the weights of a basis vector or a filter as a whole. This may be viewed as basis or filter-based fine-tuning, which requires much fewer trainable parameters than fine-tuning individual weights.

Experiments and Test Data

As noted above, the framework described herein was tested. Details of these tests are provided below. These details are provided with respect to various embodiments of the methods and systems described herein and should be not be viewed as limiting.

Models and Datasets

To study the characteristics of the framework described herein, transfer learning experiments were performed with four ImageNet pre-trained models on three other datasets. ImageNet was used as the source dataset because of its abundant features trained from 1.2 million images. The four models correspond to the architectures of VGG-16, DenseNet-121, ResNet-50, and MobileNetV2. VGG-16 has a relatively simple architecture. DenseNet-121 and ResNet-50 have skip connections realized by tensor concatenation and addition, respectively. MobileNetV2 is a very compact model with lightweight depthwise convolutions and skip connections. As the depthwise convolutions only contribute to approximately 3% of the total convolutional weights, the depthwise convolutions may not be pruned in some embodiments of the framework described herein. The three datasets include CIFAR-10, MNIST, and Fashion-MNIST. The CIFAR-10 dataset consists of 32×32 color images in 10 classes of animals and vehicles, with 50 k training images and 10 k test images. The MNIST dataset of handwritten digits (0 to 9) has 60 k 28×28 grayscale training images and 10 k test images in 10 classes. The Fashion-MNIST dataset has a training set of 60 k 28×28 grayscale training images and 10 k test images in 10 classes of fashion categories, which can be used as a drop-in replacement for MNIST. Each set of training images was split into 90% for training and 10% for validation. Only the results on the test images are reported.

Tested Frameworks

Given a pre-trained model, all layers up to and including the last convolutional layer and the associating BN and activation layers may be kept, and a global average pooling layer and a final fully-connected layer may be added. The BN layers may be trainable with the final fully-connected layer while other layers were frozen. Different frameworks may be tested based on this configuration: (a) Baseline: No layer decompositions and pruning, (b) Basis Pruning: All convolutional layers were decomposed with the basis scaling factors trainable, (c) Pruned only by the basis scaling factors (as discussed above), and (d) Double Pruning: Pruned also by the scaling factors in the BN layers (as discussed above). The framework may be applied for transfer learning from ImageNet to other tested datasets.

For the network slimming framework, as the BN layers are trainable in the baseline models with L1 regularization and non-negative constraint, the pruning may be directly applied on the baseline models followed by filter fine-tuning through BN layers.

Training Strategy

During various training embodiments, as the network architectures of the ImageNet pre-trained models were created for image size 224×224, directly applying them to the target datasets of smaller image sizes led to insufficient spatial sizes (e.g., feature maps of size 1×1) in the deeper layers and thus poor performance.

Therefore, in the training embodiments, the image size was enlarged by four times in each dimension, i.e., 128×128 for CIFAR-10 and 112×112 for MNIST and Fashion-MNIST. Image augmentation was used to reduce overfitting, with approximately ±15% of shifting in height and width for all datasets, random horizontal flipping for CIFAR-10 and Fashion-MNIST, and ±15% of rotation for MNIST. According to various embodiments, every image was zero-centered in intensity. Dropout with rate 0.5 was applied before the final fully connected layer. Stochastic gradient descent (SGD) with warm restarts by cosine annealing was used as the learning rate scheduler, with the minimum and maximum learning rates as $10^{-4}$ and $10^{-2}$, respectively.

According to various embodiments, the scheduler initially restarts at the $100^{th}$ epoch which may be increased by a factor of 1.31 at every restart. According to this embodiment, there was no decay of learning rate at restarts. The SGD optimizer may be used with a momentum of 0.9 and a batch size of 128. According to this embodiment, there were 400 epochs for each training, and the same L1 regularization parameters were imposed on the scaling factors of the BasisScalingConv and BN layers. According to various embodiments, all scaling factors were initialized to 1 and constrained to be non-negative. The thresholds for the basis scaling factors and the BN scaling factors for pruning were $10^{-2}$ and $10^{-10}$, respectively, obtained empirically. Only one iteration of pruning procedure described above was performed for each experiment, except for one framework, which used a different pruning procedure.

Effects of L1 Regularization

Figures 4A, 4B, 4C:
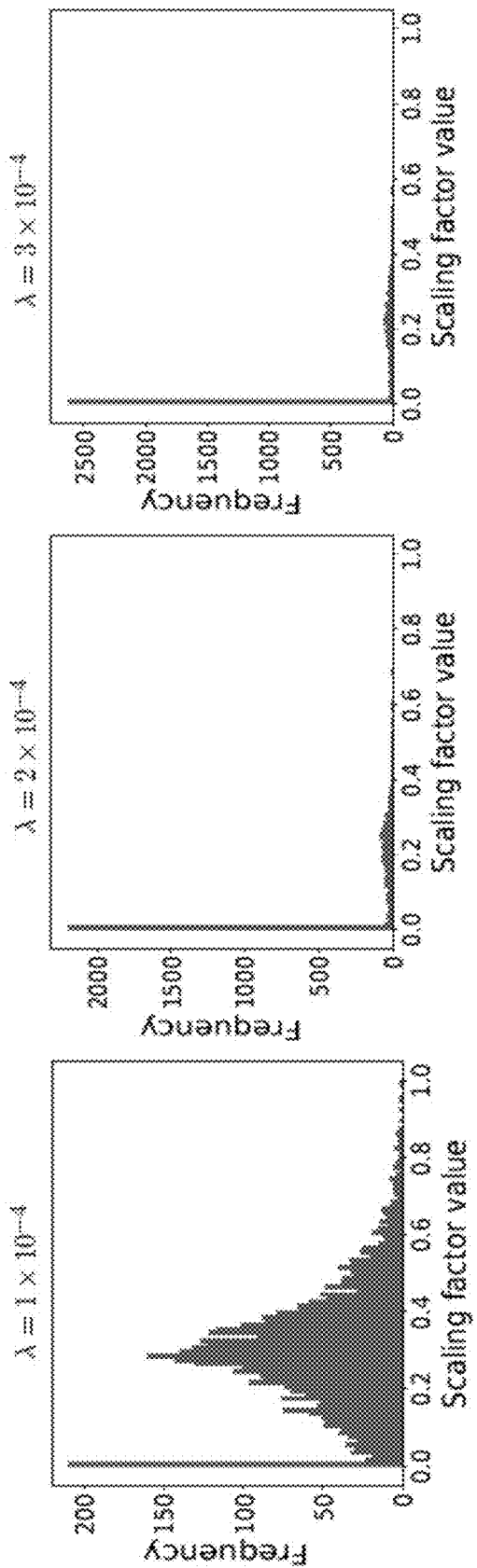
FIGS. 4A-4C illustrate the histograms of basis scaling factors in basis scaling convolutional layers of the convolutional neural network, with different L1 regularization parameters after transfer learning according to various embodiments.

Proper L1 regularization imposed on the scaling factors suppresses the magnitudes of the less important ones with minimal effects on accuracy. Therefore, experiments to study the effects of L1 regularization on embodiments of the framework described herein were performed. FIGS. 4A-4C show the histograms (100 bins) of all basis scaling factors (approximately 4.2 k) in all of the BasisScalingConv layers of VGG-16, with different L1 regularization parameters ($\lambda$) after transfer learning (Step 3 above). In FIGS. 4A-4C, the basis scaling factors correspond to different values of L1 regularization parameter ($\lambda$) on VGG-16. Larger $\lambda$ led to more scaling factors becoming <$10^{-2}$, which was found to be a suitable threshold for pruning the basis vectors without a large reduction in accuracy.

Figure 5B:
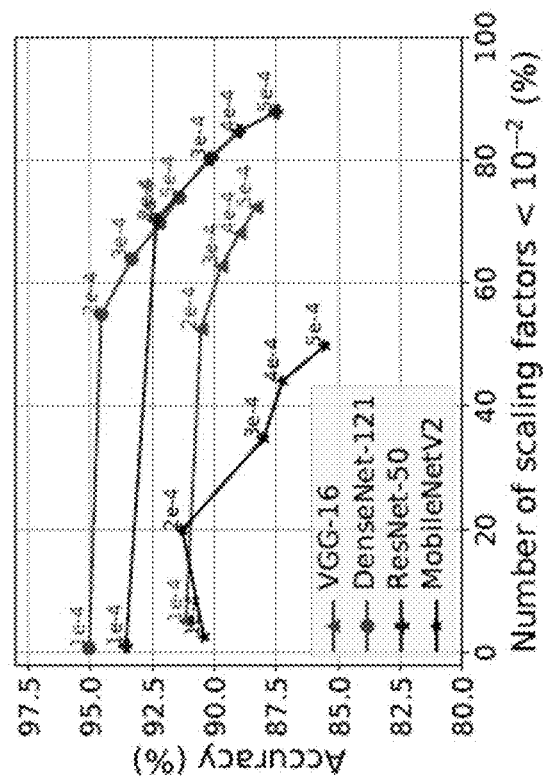
FIG. 5B illustrates accuracies versus the number of basis scaling factors less than a pruning threshold with different L1 regularization parameters according to various embodiments.
Figure 5A:
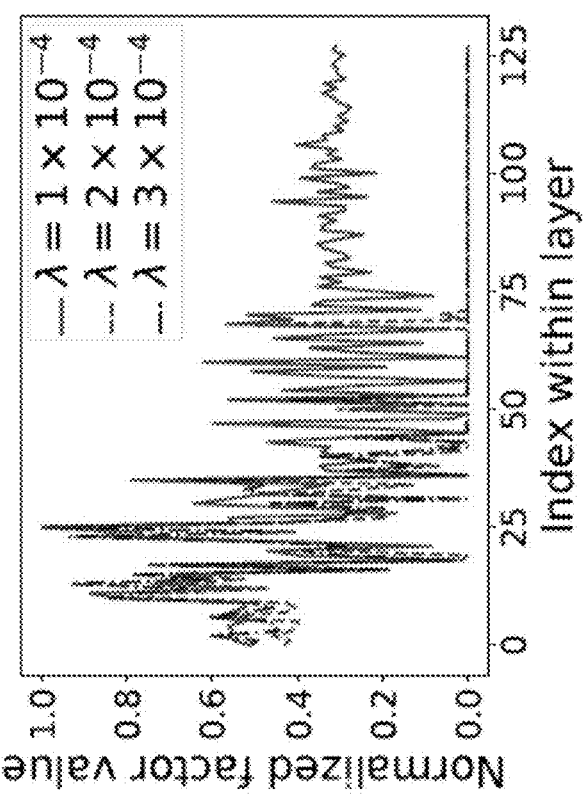
FIG. 5A illustrates basis scaling factors corresponding to different values of L1 regularization parameter on a basis scaling convolutional layer according to various embodiments.

FIG. 5A shows the normalized basis scaling factors in a BasisScalingConv layer correspond to different values of L1 regularization parameter ($\lambda$) on VGG-16. The scaling factors are sorted according to the corresponding singular values in descending order. Regardless of the values of $\lambda$, the scaling factors corresponding to the smaller singular values were more likely to be suppressed, while those corresponding to the larger singular values had similar normalized values. The larger the L1 regularization parameters ($\lambda$), the more the scaling factors of smaller singular values were pushed to zero. Nevertheless, some scaling factors of smaller singular values were large regardless of the L1 regularization parameters ($\lambda$). Therefore, instead of simply pruning according to the singular values, pruning according to a threshold which indicates importance may be performed. Removing basis vectors with scaling factors less than $10^{-2}$ provides good results based on various embodiments.

FIG. 5B shows the accuracies versus the number of basis scaling factors less than a pruning threshold with different L1 regularization parameters on CIFAR-10. Here, FIG. 5B shows the accuracies and the potential parameter reductions with different L1 regularization parameters ($\lambda$) values on CIFAR-10. $\lambda=2\times10^{-4}$ provides a significant amount of parameter reduction without a big drop in accuracy. As this can also be observed in other datasets, $\lambda=2\times10^{-4}$ was chosen to be used for further experiments under the same training strategy. Similar observations were found for the BN layers, thus the same value of the L1 regularization parameter ($\lambda$) applied.

Comparisons Between Basis Pruning and Pruning in the Original Space

Figure 6:
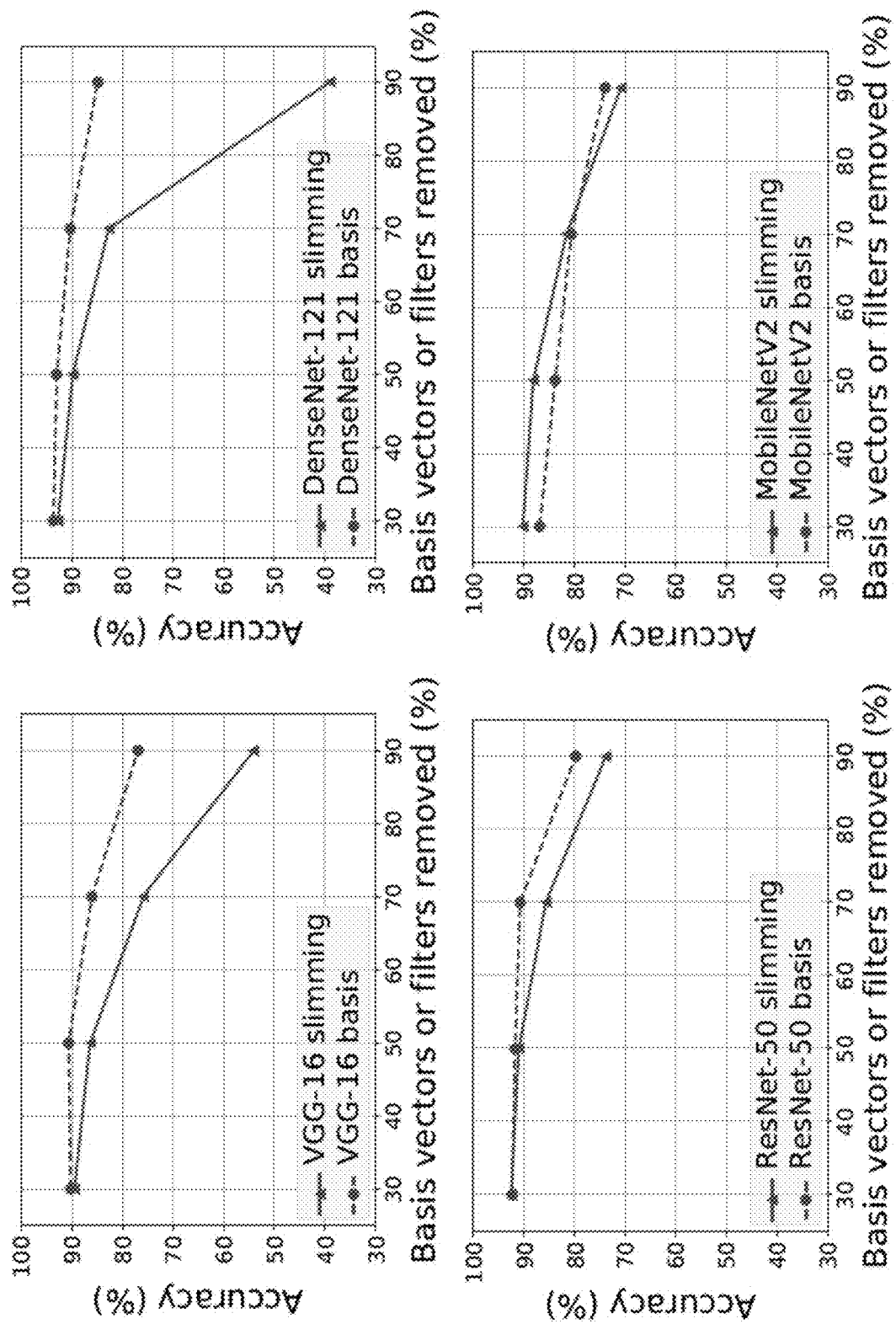
FIG. 6 illustrates comparisons between network slimming and basis pruning according to various embodiments.

FIG. 6 shows the comparisons between pruning in the original space using BN layers (i.e., network slimming) and basis pruning. FIG. 6 shows comparisons between network slimming and basis pruning in CIFAR-10. Each convolutional layer had the same percentage of basis vectors or filters removed. Different percentages (30%, 50%, 70% and 90%) were tested. To investigate the effects of pruning on accuracies, after Step 3 above, the models may be pruned by removing a fixed percentage of the least important basis vectors or filters from every layer. Then, Step 5 above may be performed to fine-tune the pruned models.

For all models, network slimming had larger reductions in accuracies as the percentages of removed filters increased. Such reductions in accuracies were less severe for ResNet-50 and MobileNetV2 but were relatively large in VGG-16 and DenseNet-121. In contrast, the reductions in accuracies were much smaller for basis pruning. This is consistent with the concept that the features are less distributed under the orthonormal basis, thus pruning can be performed with less reductions in accuracies.

Comparisons Among Frameworks

FIGS. 7A-7E show Tables 1-5, respectively. Tables 1-3 show the performance of various embodiments of the "Basis" Pruning and "Double" Pruning frameworks described herein and the comparisons with other frameworks.

In particular, FIG. 7A (Table 1) shows pruning results on CIFAR-10 with ImageNet pre-trained models. FIG. 7B (Table 2) shows pruning results on MNIST with ImageNet pre-trained models. FIG. 7C (Table 3) shows pruning results on Fashion-MNIST with ImageNet pre-trained models. FIG. 7D (Table 4) shows numbers of total and trainable parameters before pruning. FIG. 7E (Table 5) shows pruning results on CIFAR-10 (20% training) with ImageNet pre-trained models.

In the tables, PR means pruning ratio and the best results after pruning are bolded. In Tables 2 and 3, the images were up sampled to 112×112, and in Tables 1 and 5, the images were up sampled to 128×128. The transfer learning results were proportional to the difficulties of the datasets. The best classification accuracies after pruning were 94.1%, 99.6%, and 94.4% for CIFAR-10, MNIST, and Fashion-MNIST, respectively. Regardless of the datasets, the baseline models of DenseNet-121 and ResNet-50 performed better than the other baseline models, with DenseNet-121 being slightly better than ResNet-50. For VGG-16, the accuracies after pruning by our algorithm were better than the baseline models. For VGG-16 and ResNet-50 which had more parameters and FLOPs among the baseline models, with similar accuracies, the basis pruning algorithm achieved better pruning ratios than pruning by BN layers alone (i.e., network slimming). The double pruning algorithm achieved even larger pruning ratios with less than 0.1% reduction or even increase in accuracies.

Different frameworks behaved differently on different models and datasets. For DenseNet-121, on CIFAR-10 and MNIST, network slimming produced large pruning ratios but accompanied with large reductions in accuracies, especially for MNIST (99.9% pruning ratio with 48.5% accuracy). In contrast, the basis pruning framework was more stable though the pruning ratios were smaller. For MobileNetV2, the pruning ratios of basis pruning were smaller than those of network slimming. The pruning ratio of FLOPs was even negative on CIFAR-10 with basis pruning as only 13.5% of parameters were pruned. On the other hand, double pruning produced pruning ratios larger than network slimming on both MNIST and Fashion-MNIST.

Transfer Learning with Limited Data

Table 4 shows the numbers of total and trainable parameters before pruning. As only the BN layers, the basis scaling factors, and the final fully-connected layer were trainable in each model, the numbers of trainable parameters were very small (<104 k). To verify the performance with limited data, experiments with only 20% of CIFAR-10 training images were performed. Apart from the frameworks which use basis or filter-based fine-tuning, experiments on a framework using the first-order Taylor expansion (Taylor-FO) for importance approximations was performed, and fine-tuning was performed on all the weights in the models. Table 5 shows that the Taylor-FO framework had the lowest accuracies on both DenseNet-121 and ResNet-50. Furthermore, for ResNet-50, although Taylor-FO had the largest pruning ratio in parameters, it had the second lowest pruning ratio in FLOPs. Therefore, using basis or filter-based fine-tuning is advantageous when training data are limited.

Experiment Conclusion

As evidenced by the above experiments and test data, the framework described herein provides efficient transfer learning framework that performs pruning and fine-tuning of trained convolutional weights in a transformed space. Using singular value decomposition, a convolutional layer can be decomposed into two consecutive layers with the basis vectors as their convolutional weights. With the basis scaling factors introduced, the basis vectors can be fine-tuned and pruned to reduce the network size and inference time. Using also the scaling factors from the batch normalization layers, simultaneous double pruning can be achieved. Experimental results show that the basis vectors with smaller singular values are more likely to be pruned, and pruning of basis vectors leads to less reduction in accuracy than pruning in the original space. When transferring ImageNet pre-trained features to other datasets, high classification accuracy with pruning ratios larger than 99% can be achieved. Also, as shown above, large pruning ratios and high levels of accuracy can be maintained even when only 20% of the CIFAR-10 training data are used. This is a desired characteristic for transfer learning in data-limited scenarios.

The method may include (i) providing a pre-trained deep neural network that includes convolutional layers (each convolutional layer comprises a weight matrix for convolution), and (ii) decomposing each weight matrix by compact singular value decomposition into three matrices: a matrix whose columns are the left singular vectors (U), a diagonal matrix of singular values ($\Sigma$), and a matrix whose columns are the right singular vectors (V). Each of U and V is an orthonormal basis. The numbers of the left and right singular vectors are the same, which equal the number of singular values. The method may also include (iii) using the decomposed matrices, each convolutional layer is decomposed into two consecutive layers. The first layer is a convolutional layer with U as the weight matrix. The second layer is a basis-scaling convolutional (BasisScalingConv) layer, whose weight matrix is the multiplication of $\Sigma$ and the transpose of V. This BasisScalingConv layer comprises the basis scaling factors trainable by backpropagation. The number of basis scaling factors is the same as the number of singular values. Each row of the weight matrix in the BasisScalingConv layer is multiplied by the corresponding basis scaling factor before convolution.

The method may also include (iv) training the basis scaling factors of the BasisScalingConv layers, and (v) removing any basis scaling factors, singular values in $\Sigma$, and singular vectors in U and V having the corresponding basis scaling factors lower than a given threshold. Operations (iv) to (v) may be repeated until at least one converging criterion is met. The method may also include adding a batch normalization layer after each convolutional layer if it does not exist. The method may also include if batch normalization layers exist, removing any filters in the weight matrices having the corresponding scaling factors in the batch normalization layers lower than a given threshold.

Accordingly, embodiments described herein provide a framework for fine-tuning and pruning orthogonal bases obtained by applying singular value decomposition (SVD) on convolutional weight matrices. In particular, embodiments described herein apply a basis pruning algorithm that prunes any convolutional layer in an orthogonal sub-space. As basis vectors are non-trainable in some embodiments to facilitate transfer learning, basis scaling factors are instructed, which are responsible for both importance estimation and fine-tuning of basis vectors. These basis scaling factors are trainable by backpropagation during transfer learning and only contribute a small number of trainable parameters. Therefore, the framework described herein is ideal for transfer learning with limited training date. In addition, as BN layers are also trainable during transfer learning, the framework described herein uses a double pruning algorithm that combines basis pruning and network sliming for better flexibility and higher pruning ratios.

Various features and advantages of the embodiments are set forth in the following claims.

What is claimed is:

1. A computer-implemented method comprising:
obtaining a pre-trained deep convolutional neural network (DCNN) including convolution layers, wherein each convolution layer includes a respective weight matrix for convolution;
decomposing each weight matrix of the DCNN into a left matrix whose columns are the left singular vectors, a diagonal matrix of singular values, and a right matrix whose columns are the right singular vectors, wherein each of the left singular vectors and the right singular vectors is an orthonormal basis, the number of the left singular vectors is the same as the number of the right singular vectors and is the same as the number of the singular values;

decomposing, using the decomposed matrices, each convolutional layer of the DCNN into two respective consecutive layers, the two respective consecutive layers including a respective first layer that is a convolutional layer with the left matrix as the weight matrix of the first layer, and a respective second layer that is a basis-scaling convolutional layer having a weight matrix that is derived by a function of the singular values and the right singular vectors; and training the DCNN by training basis scaling factors of the basis-scaling convolutional layers for transfer learning such that the DCNN becomes a fine-tuned convolutional neural network (FTCNN), wherein during the training other weights of the first layers and of the second layers are not trainable, wherein each basis scaling factor corresponds to a respective one of the left singular vectors and to a respective one of the right singular vectors, wherein the basis scaling factors are used to rescale a corresponding row of convolutional weights of the second layer, and wherein the training further comprises iteratively pruning one or more layers of the DCNN after one or more epochs of the training, the pruning comprising:

removing the basis scaling factors from each second layer of the one or more pruned layers; and removing the left singular vectors in the left matrix and the right singular vectors in the right matrix that correspond to the removed basis scaling factors.

2. The computer-implemented method of claim 1, further comprising:

adding a respective batch normalization layer after one or more of the convolutional layers.

3. The computer-implemented method of claim 1, wherein the left singular vectors are orthogonal to each other and the right singular vectors are orthogonal to each other, but the left singular vectors and the right singular vectors do not have any explicit relation.

4. The computer-implemented method of claim 2, wherein the pruning comprises double pruning via:

removing iteratively, after the one or more epochs of the training, scaling factors from each batch normalization layer of one or more other pruned layers of the DCNN; and removing, from the one or more other pruned layers, matrix components in the left matrix and the right matrix that correspond to the removed scaling factors.

5. The computer-implemented method of claim 1, further comprising: performing computer vision processing using the FTCNN to detect an object in captured imagery or in an image dataset.

6. The computer-implemented method of claim 1, wherein the decomposing of each weight matrix occurs via compact singular value decomposition (SVD).

7. The computer-implemented method of claim 1, wherein the training occurs for a training dataset that is smaller than a pre-training dataset that was used to pretrain the DCNN.

8. A computer system comprising:
a processor set;
one or more computer-readable storage media; and
instructions stored on the one or more computer-readable storage media to cause the processor set to perform operations comprising:

obtaining a pre-trained deep convolutional neural network (DCNN) including convolution layers, wherein each convolution layer includes a weight matrix for convolution;

decomposing each weight matrix of the DCNN into a left matrix whose columns are the left singular vectors, a diagonal matrix of singular values, and a right matrix whose columns are the right singular vectors, wherein each of the left singular vectors and the right singular vectors is an orthonormal basis, the number of the left singular vectors is the same as the number of the right singular vectors and is the same as the number of the singular values;

decomposing, using the decomposed matrices, each convolutional layer of the DCNN into two respective consecutive layers, the two respective consecutive layers including a respective first layer that is a convolutional layer with the left matrix as the weight matrix of the first layer, and a respective second layer that is a basis-scaling convolutional layer having a weight matrix that is derived by a function of the singular values and the right singular vectors; and training the DCNN by training basis scaling factors of the basis-scaling convolutional layers for transfer learning such that the DCNN becomes a fine-tuned convolutional neural network (FTCNN), wherein during the training other weights of the first layers and of the second layers are not trainable, wherein each basis scaling factor corresponds to a respective one of the left singular vectors and to a respective one of the right singular vectors, wherein the basis scaling factors are used to rescale a corresponding row of convolutional weights of the second layer, and wherein the training further comprises iteratively pruning one or more layers of the DCNN after one or more epochs of the training, the pruning comprising:

removing the basis scaling factors from each second layer of the one or more pruned layers; and removing the left singular vectors in the left matrix and the right singular vectors in the right matrix that correspond to the removed basis scaling factors.

9. The computer system of claim 8, wherein the operations further comprise adding a batch normalization layer after one or more of the convolutional layers.

10. The computer system of claim 8, wherein the left singular vectors are orthogonal to each other and the right singular vectors are orthogonal to each other, but the left singular vectors and the right singular vectors do not have any explicit relation.

11. The computer system of claim 9, wherein the pruning comprises double pruning via:

removing, iteratively, after the one or more epochs of the training, scaling factors from each batch normalization layer of one or more other pruned layers of the DCNN; and removing, from the one or more other pruned layers, matrix components in the left matrix and the right matrix that correspond to the removed scaling factors.

12. The computer system of claim 9, wherein the operations further comprise performing computer vision processing using the FTCNN to detect an object in captured imagery or an image dataset.

13. The computer system of claim 8, wherein the training occurs for a training dataset that is smaller than a pre-training dataset that was used to pretrain the DCNN.

14. A computer program product comprising:
- a non-transitory computer readable medium; and
- computer executable instructions stored on the non-transitory computer readable medium to perform operations comprising:
    - obtaining a pre-trained deep convolutional neural network (DCNN) including convolution layers, wherein each convolution layer includes a weight matrix for convolution;
    - decomposing each weight matrix of the DCNN into a left matrix whose columns are the left singular vectors, a diagonal matrix of singular values, and a right matrix whose columns are the right singular vectors, wherein each of the left singular vectors and the right singular vectors is an orthonormal basis, the number of the left singular vectors is the same as the number of the right singular vectors and is the same as the number of the singular values;
    - decomposing, using the decomposed matrices, each convolutional layer of the DCNN into two respective consecutive layers, the two respective consecutive layers including a respective first layer that is a convolutional layer with the left matrix as the weight matrix of the first layer, and a respective second layer that is a basis-scaling convolutional layer having a weight matrix that is derived by a function of the singular values and the right singular vectors; and
    - training the DCNN by training basis scaling factors of the basis-scaling convolutional layers for transfer learning such that the DCNN becomes a fine-tuned convolutional neural network (FTCNN), wherein during the training other weights of the first layers and of the second layers are not trainable, wherein each basis scaling factor corresponds to a respective one of the left singular vectors and to a respective one of the right singular vectors, wherein the basis scaling factors are used to rescale a corresponding row of convolutional weights of the second layer, and wherein the training further comprises iteratively pruning one or more layers of the DCNN after one or more epochs of the training, the pruning comprising:
        - removing the basis scaling factors from each second layer of the one or more pruned layers; and
        - removing the left singular vectors in the left matrix and the right singular vectors in the right matrix that correspond to the removed basis scaling factors.

15. The computer program product of claim 14, wherein the operations further comprise adding a respective batch normalization layer after one or more of the convolutional layers.

16. The computer program product of claim 14, wherein the left singular vectors are orthogonal to each other and the right singular vectors are orthogonal to each other, but the left singular vectors and the right singular vectors do not have any explicit relation.

17. The computer program product of claim 14, wherein the operations further comprise performing computer vision processing using the FTCNN to detect an object in captured imagery or in an image dataset.

18. The computer program product of claim 15, wherein the pruning comprises double pruning via:
- removing iteratively, after the one or more epochs of the training, scaling factors from each batch normalization layer of one or more other pruned layers of the DCNN; and
- removing, from the one or more other pruned layers, matrix components in the left matrix and the right matrix that correspond to the removed scaling factors.

19. The computer program product of claim 14, wherein the decomposing of each weight matrix occurs via compact singular value decomposition (SVD).

20. The computer program product of claim 14, wherein the training occurs for a training dataset that is smaller than a pre-training dataset that was used to pretrain the DCNN.

* * * * *